United States Patent
Griessbach

(10) Patent No.: US 6,542,273 B1
(45) Date of Patent: Apr. 1, 2003

(54) DATA BUS FOR VEHICLES HAVING MULTIPLE PASSENGER SAFETY DEVICES

(75) Inventor: Robert Griessbach, Weyarn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/254,483

(22) PCT Filed: Aug. 27, 1997

(86) PCT No.: PCT/EP97/04670

§ 371 (c)(1),
(2), (4) Date: May 26, 1999

(87) PCT Pub. No.: WO98/09843

PCT Pub. Date: Mar. 12, 1998

(30) Foreign Application Priority Data

Sep. 7, 1996 (DE) .......................... 196 36 441

(51) Int. Cl.[7] .................. H04B 10/00; H04B 10/20; H04J 14/08; B60Q 1/00
(52) U.S. Cl. ............... 359/158; 359/120; 359/119; 359/135; 359/136; 340/438
(58) Field of Search .............. 340/438, 428; 359/120, 119, 126, 123, 135, 136, 158

(56) References Cited

U.S. PATENT DOCUMENTS

| | | | |
|---|---|---|---|
| 4,237,550 A | * 12/1980 | Steensma ....................... | 370/4 |
| 4,654,890 A | * 3/1987 | Hasegawa et al. .......... | 455/607 |
| 4,748,617 A | * 5/1988 | Drewlo ......................... | 370/85 |
| 5,309,436 A | 5/1994 | Hirano et al. .............. | 370/85.1 |

FOREIGN PATENT DOCUMENTS

| | | |
|---|---|---|
| DE | 31 50 313 C2 | 8/1983 |
| DE | WO 85/03826 | 8/1985 |
| DE | 3424866 A1 | 1/1986 |
| DE | 37 37 554 A1 | 5/1989 |
| DE | WO 89/09146 | 10/1989 |
| DE | 38 25 099 C2 | 1/1990 |
| DE | 39 36 894 A1 | 5/1991 |
| DE | 195 03 214 C1 | 2/1995 |
| DE | WO 96/08097 | 3/1996 |
| DE | 195 15 633 A1 | 10/1996 |
| GB | 2 290 682 A | 1/1996 |
| WO | WO 91/06447 | 5/1991 |

OTHER PUBLICATIONS

"Interfaces und Datennetze", Gerhard Schnell and Konrad Hoyer; Friedr. Vieweg & Sohn Verlagsges. mbH, Braunschweig, 1989, pps. 24–29.

* cited by examiner

Primary Examiner—Leslie Pascal
Assistant Examiner—M. R. Sedighian
(74) Attorney, Agent, or Firm—Crowell & Moring LLP

(57) ABSTRACT

In a data bus for vehicles with several passenger safety devices, the devices are synchronized by a synchronization pulse and also share the data bus. The clock of the synchronization pulse is shorter than the accumulated transmission times of the bus-sharing devices.

10 Claims, 2 Drawing Sheets

DATA BUS FOR VEHICLES HAVING MULTIPLE PASSENGER SAFETY DEVICES

BACKGROUND AND SUMMARY OF THE INVENTION

This application is related to the Applicant's co-pending application Ser. No. 09/254,391, filed Mar. 8, 1999.

The invention relates to a data bus for communication among several devices in a motor vehicle which serve to ensure the safety of the passengers.

Such safety devices include actuators (such as airbags and safety belt tighteners, for example); or they also may be sensors that provide information regarding safety conditions or test data, respectively. Such a data bus differs significantly from other known, common place data buses in vehicles, both in terms of its importance and functionality. Known data buses serve to exchange data between all components. The components are assigned to subsystems of the vehicle, and include, for example, digital engine electronics, electronic hydraulic transmission control and an anti-lock braking system. Such subsystems work satisfactorily only when data exchange among all components is made possible.

In contrast, in a data bus for safety-relevant devices, the exchange of data among all components is not the primary goal. Instead, the capability to be able to react as fast as possible to critical situations is of primary importance. Here, the term "react" means the deployment of an air bag, for example, in the area of the door. If the possibility for all components of such a data bus to communicate with each other is desired, then this would result in critical situations, and as a consequence (because of the execution times of the signals of all components) the information concerning the critical safety condition does not arrive at the appropriate actuator in time.

It is therefore an object of the invention to create a data bus which is suitable for interconnecting devices which ensure the safety of passengers in a vehicle.

Another object of the invention is to provide a data bus in which transmission of a signal to the appropriate actuator in a timely manner is guaranteed.

These and other objects and advantages are achieved by the data bus according to the invention, in which the components of the data bus are synchronized via a synchronizing pulse, the phase of the basic cycle of the synchronizing pulse is smaller than the cumulative transmission time of all of the components, and the phase of the basic cycle equals the cumulative transmission times of a predetermined number of the components with the highest priority, plus the time intervals (t_wx) which separate such transmissions from each other and from the synchronizing pulses.

The use of a synchronizing pulse serves to determine the renewal rate of the data, and to keep it constant independently of the number of components. The choice of the basic cycle phase in the manner described serves when needed (i.e., in a situation which is critical for ensuring the safety of the passengers) to release one or more actuators, such that only the components which are responsible for reacting to this particular condition are allowed to transmit their signal. These components of the data bus are usually those with the highest transmission priority. After the output of the synchronizing pulse, they access the data bus and make available the information regarding a condition which is critical for the safety of the passengers. The components which react to this information, for example, by deploying an airbag, cannot themselves access the data bus during the basic cycle phase (a condition which also applies for those components that send data with a lower priority ranking).

The basic cycle phase is timed such that the components having the highest priority can transmit to the data bus during the basic cycle phase (even when all of them signal a critical condition), while components having a lower priority ranking cannot access the data bus in these cases. As long as the condition which is critical for ensuring the safety of the passengers lasts, and the components with the highest priority output transmit their data to the data bus, other components are practically prevented from transferring their information to the data bus.

International patent document WO 96/08097 A discloses a process for the transfer of data between data processing stations or devices for automation technology, in which all stations work according to a constant, synchronized time cycle. The cycle is divided into three phases which run in the following order: synchronizing phase, broadcast phase and message phase. In the broadcast phase, each station releases exactly one segment of data for transmission (which is actually transmitted), while during the message phase each station may release and transmit (when authorized to do so) until the message phase comes to an end.

In accordance with the objects of the invention, the basic cycle phase has been significantly minimized. Therefore, a component may access the data bus at a point in time when the next synchronizing pulse is being sent. In this case, it is desirable to delay the output of the synchronizing pulse until the component has completed its transmission.

Particularly in a case such as this, in order to be able to maintain the phase frequency, output of the following synchronizing pulse is to be synchronized with the next to last previous synchronizing pulse. If the next to last previous synchronizing pulse is designated as the first pulse and the following as the second pulse, third pulse, etc., then the time span between the first and the second pulses is larger than the phase of the basic cycle, while the time span between the second and the third pulses is smaller than the phase of the basic cycle. Should a component once more transmit to the data bus at the output time of the third synchronizing pulse, then the third synchronizing pulse is also output with a delay. The subsequent synchronizing pulse, (in this case the fourth one), compensates for exceeding the time provided, etc.

The data bus can be a conventionally hard-wired system. For protection from interference, it can be advantageous to provide a data bus which is based on beam wave guides with active star couplers connecting the components to the data bus.

With regard to the configuration and the response characteristic of the data bus, it can be advantageous if the components transmit only in a situation which is critical for ensuring the safety of the passengers. In addition, the components can also transmit in greater time intervals (a multiple of the basic cycle phase). In this way, it is guaranteed that in situations which are not critical for ensuring the safety of the passengers, the information of those components which do not have the highest transmission priority in a situation which is critical for safety reasons, is transmitted to the data bus.

Other objects, advantages and novel features of the present invention will become apparent from the following detailed description of the invention when considered in conjunction with the accompanying drawings.

DETAILED DESCRIPTION OF THE DRAWINGS

Figure 1:
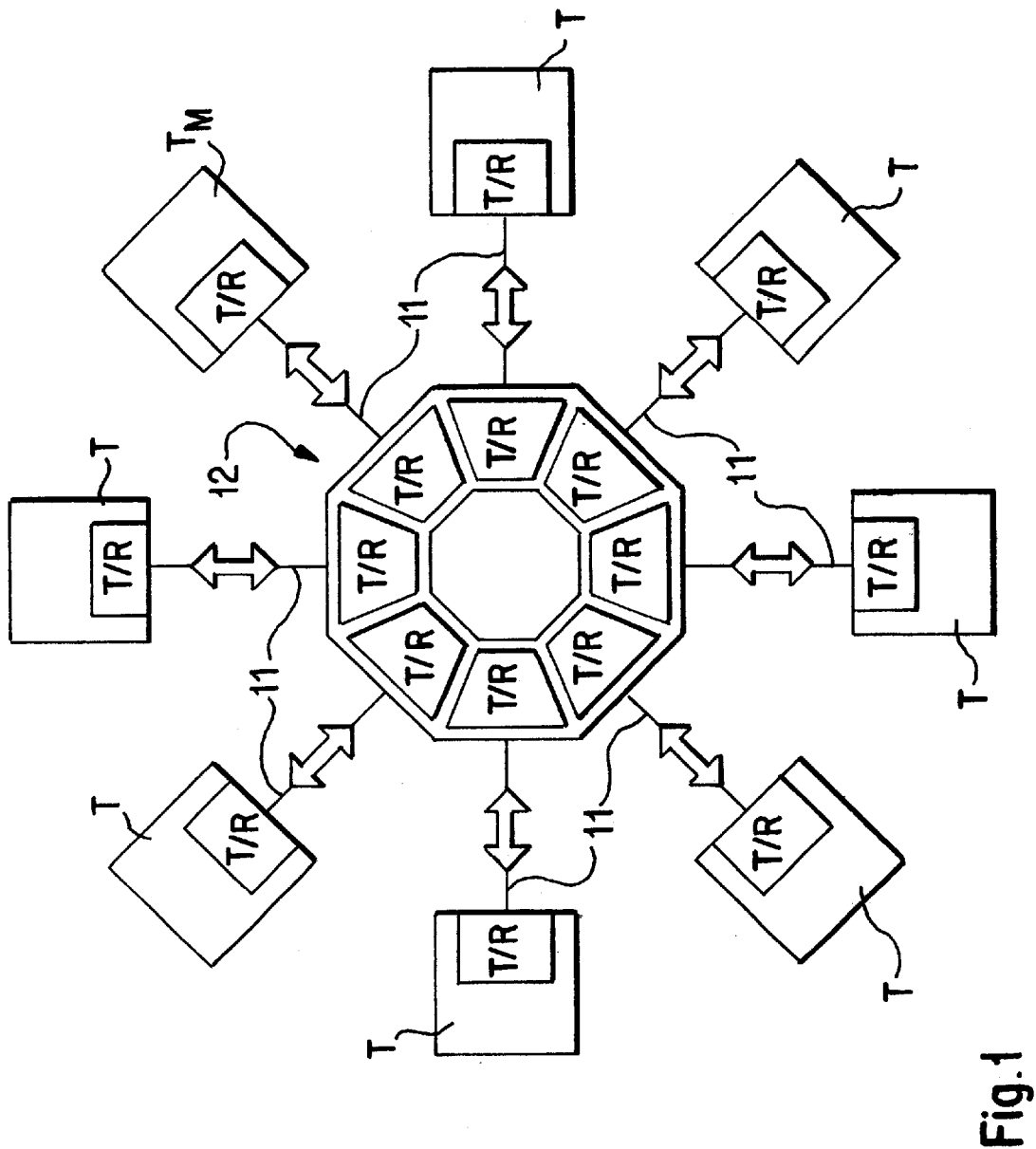
FIG. 1 depicts schematically a data bus for several devices which serve the safety of the passengers.

The data bus shown in FIG. 1 consists principally of a single beam wave guide (in the following referred to as beam wave guide fiber). The individual components T are connected with each other via the beam wave guide fiber 11 and an active star coupler 12.

For connecting to the beam wave guide bus, each component has a transmit-receive module T/R, into which a transmission and reception diode as well as a beam splitting lens are integrated (not shown). The beam wave guide line 11 is made up of the beam wave guide fiber, and is operated in both directions, as indicated by the arrow in each branch. The active star coupler 12 is primarily made up of the transmit-receive modules. Each component T has a transmit-receive module. The modules are configured in the star coupler 12 in such a manner that the data transmitted by one component T is distributed to all other branches of the bus system. These branches are primarily formed by the transmit-receive modules of the star coupler and the corresponding transmit-receive modules of the respective components.

Figure 2:
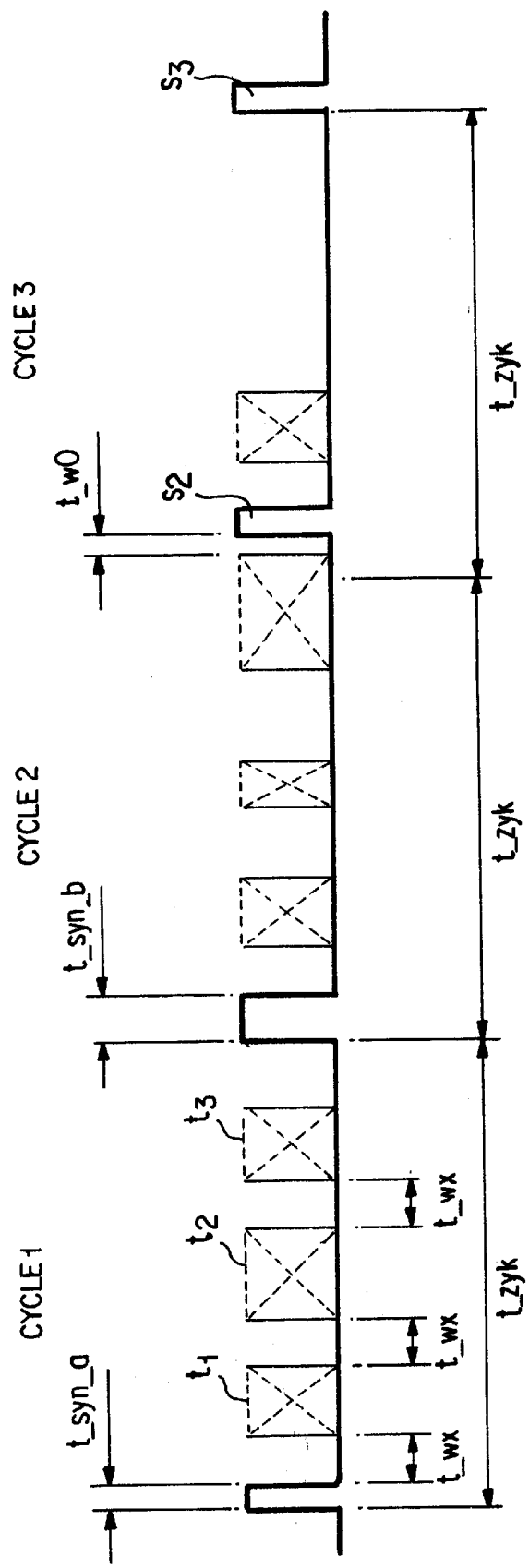
FIG. 2 depicts a diagram for explaining the data exchange traffic on the data bus which is shown in FIG. 1.

One of the components $T_M$ serves as the bus master. This component transmits a synchronizing pulse at regular time intervals, as depicted in FIG. 2. With a predetermined transmission priority order, the components receive the authority to transmit. When a component T finds itself in a situation where no condition is indicated that is critical for ensuring the safety of the passenger, then as a rule the component does not transmit. In this context, the words "as a rule" exclude the initialization process after starting the vehicle when the components identify themselves via an identification key vis-a-vis the other components and the bus master. The components, however, report back cyclically in relatively long time intervals.

If a condition exists, which is not critical for ensuring the safety of the passengers, i.e., none of the components are transmitting, then the next synchronizing pulse, (after completing the phase of the basic cycle) is output by the bus master.

In a condition which is critical for ensuring passenger safety, for example when the bus component with the highest transmission priority is activated, the data bus is occupied first by this component's data $t_1$. The component with the next highest priority ranking now transmits its data $t_2$. Corresponding action occurs with regard to the component possessing the data $t_3$.

As is known from German patent document DE 34 35 216 A, every data $t_1$ possesses an identification key, on the basis of which the other component can identify the data and if necessary receive it. It is also possible to transmit a signal to the data bus, which is meant for only one specific addressee. Upon the completion of the basic cycle phase, and if no component transmits at this point, an output of the next synchronizing pulse occurs.

However, if a component transmits at the time when the basic cycle phase ends, then the output of the synchronizing pulse is delayed. This case is depicted in the time span designated as cycle 2. The delay must be smaller than the time interval which exists between the transmission of data by components which follow one another. The following synchronizing pulse is synchronized with the first, which was output at the beginning of cycle 1. The time interval between the synchronizing pulse s and s is smaller than the basic cycle phase. In this way, for the first time it becomes possible to allow devices which are responsible for the safety of the passengers of an automobile to communicate with each other via a data bus.

The foregoing disclosure has been set forth merely to illustrate the invention and is not intended to be limiting. Since modifications of the disclosed.embodiments incorporating the spirit and substance of the invention may occur to persons skilled in the art, the invention should be construed to include everything within the scope of the appended claims and equivalents thereof.

What is claimed is:

1. Data bus for vehicles having a plurality of components which serve to ensure safety of passengers, each of which components has an assigned transmission priority, said data bus comprising:

a beam wave guide;

components coupled to the beam wave guide; and an active star coupler coupled to the beam wave guide; wherein the components are synchronized via synchronizing pulses;

time duration of a basic cycle phase of the synchronizing pulse is smaller than the sum of transmission times of all of said plurality of the components of the data bus; and the time duration of the basic cycle phase equals the sum of transmission times of a predetermined number of the components having a highest transmission priority, plus time intervals which exist between said transmission times of said predetermined number of components, and between said transmission times and said synchronizing pulses.

2. The data bus in accordance with claim 1, wherein, if a component is sending data at an end of the basic cycle phase, transmission of a next succeeding synchronizing pulse is delayed until completion of data transmission.

3. The data bus in accordance with claim 2, wherein a synchronizing pulse following a synchronizing pulse which has been delayed is synchronized by reference to an undelayed previous synchronizing pulse.

4. The data bus in accordance with claim 3, wherein the components are interconnected via the active star coupler.

5. The data bus in accordance with claim 3, wherein components transmit signals only during situations which are critical to ensuring passenger safety.

6. The data bus in accordance with claim 2, wherein the components are interconnected via the active star coupler.

7. The data bus in accordance with claim 2, wherein the components transmit signals only during situations which are critical to ensuring passenger safety.

8. The data bus in accordance with claim 1, wherein the components are interconnected via the active star coupler.

9. The data bus in accordance with claim 8, wherein the components transmit signals only during situations which are critical to ensuring passenger safety.

10. The data bus in accordance with claim 1, wherein the components transmit signals only during situations which are critical to ensuring passenger safety.

* * * * *